United States Patent
Ju et al.

[19]

[11] Patent Number: 6,064,637
[45] Date of Patent: May 16, 2000

[54] FOCUSING AND TRACKING METHOD AND SYSTEM FOR THE READ/WRITE HEAD OF AN OPTICAL DRIVE

[75] Inventors: Jau-Jiu Ju, Hsinchu Hsien; Pei-Yih Liu, Changhua Hsien; Shin-Ter Tsai, Taipei; Tsung-Ming Yang, Chilung, all of Taiwan

[73] Assignee: Industrial Technology Research Institute, Taiwan

[21] Appl. No.: 09/009,303

[22] Filed: Jan. 20, 1998

[30] Foreign Application Priority Data

Oct. 14, 1997 [TW] Taiwan ................................. 86114985

[51] Int. Cl.$^7$ ......................................................... G11B 7/00
[52] U.S. Cl. ..................................... 369/44.23; 369/44.14; 369/112; 369/120
[58] Field of Search ............................... 369/44.14, 44.23, 369/44.37, 44.41, 44.42, 109, 103, 112, 120

[56] References Cited

U.S. PATENT DOCUMENTS

| | | |
|---|---|---|
| 4,654,516 | 3/1987 | Ando . |
| 4,654,519 | 3/1987 | Ando . |
| 4,701,604 | 10/1987 | Ando . |
| 5,404,344 | 4/1995 | Imada et al. ..................... 369/44.23 X |
| 5,793,725 | 8/1998 | Tezuka et al. ....................... 369/44.23 |

FOREIGN PATENT DOCUMENTS

| | | |
|---|---|---|
| 54-39101 | 8/1977 | Japan . |
| 59-167863 | 3/1983 | Japan . |

*Primary Examiner*—Paul W. Huber
*Attorney, Agent, or Firm*—Rabin & Champagne, PC

[57] ABSTRACT

A focusing and tracking method and system for use on the read/write head of an optical drive is provided. The focusing and tracking method and system is capable of detecting both the focusing error and the tracking error of the read/write head to thereby control the focusing and tracking of the same during read operation. In particular, this focusing and tracking method and system combines the use of a knife-edge focusing method and a push-pull tracking method respectively for focusing and tracking of the read/write head. A specially designed photo detector is used to obtain both the focusing error signal and the tracking error signal. This allows the focusing and tracking system to be simplified in structural complexity, thereby saving manufacturing cost. Moreover, since the focusing error signal and the tracking error signal are obtained respectively in perpendicular directions, the undesired effect of cross-talk between the two error signals can be avoided.

50 Claims, 8 Drawing Sheets

FOCUSING AND TRACKING METHOD AND SYSTEM FOR THE READ/WRITE HEAD OF AN OPTICAL DRIVE

BACKGROUND OF THE INVENTION

1. Field of the Invention

This invention relates to optical drives used to read data from optical discs, and more particularly, to a focusing and tracking method and system for use on the read/write head of an optical drive to control the focusing and tracking of the same during read operation. This invention utilizes a combination of the knife-edge focusing method and the push-pull tracking method and a specially designed photo detector that can be used to obtain both the focusing error signal and the tracking error signal, allowing the system to be simplified in structural complexity, thereby saving manufacturing cost.

2. Description of Related Art

An optical disc, commonly known as a compact disc (CD), is a mass storage medium, which is a nonmagnetic, polished metal disc that can hold a very larger volume of digital data compared to conventional magnetic discs. In terms of the type and use of the stored data, optical discs are named differently, such as Audio CD, Video CD, CD-ROM (compact-disc read-only-memory) CD-Interactive (CD-I), CD Recordable (CD-R), and CD-Erasable (CD-E). Further, a new type of multiple-layer high-density optical disc named DVD (digital video disc or digital versatile disc) is currently available and gradually becoming very demanding due to its extremely high storage capacity. There exists, therefore, a need for optical drives that are capable of reading data from all of these various types of optical discs.

To read data from an optical disc, the read/write head should be capable of focusing a laser beam on the optical disc. During the read operation, however, external vibrations could cause defocusing to the laser beam. To solve this problem, the optical drive is provided with feedback control means that takes a focusing error signal as feedback signal to thereby control the focusing of the laser beam. Moreover, during read operation, the read/write head is constantly moving radially from track to track so as to seek for the needed data. However, external vibrations or other factors could cause mistracking to the laser beam such that the laser beam is not spotted on the target track where the data to be read out are located. To be able to read data from various types of optical discs, the read/write head should be provided with a laser source capable of generating various wavelengths of laser beams, or alternatively provided with various object lens that can be used to focus the laser beam precisely on the optical disc. In the case of a DVD having a plate thickness of 0.6 mm and a track pitch of 0.74 $\mu$m (micrometer), the object lens used in the optical drive for focusing the laser beam should have a numerical aperture (NA) of 0.6 and the laser beam used to read this disc should have a wavelength of 650 nm (nanometer); while in the case of a CD (compact disc) having a plate thickness of 1.2 mm and a track pitch of 1.6 $\mu$m, the object lens should have an NA of 0.45 and the laser beam used to read this disc should have a wavelength of 780 nm. Conventional focusing methods for use on an optical read/write head include, for example, the so-called knife-edge focusing method and the astigmatic focusing method. Optical read/write heads that utilize the knife-edge focusing method are disclosed in U.S. Pat. Nos. 4,654,516; 4,701,604; and 4,654,519, to name a few.

FIG. 1 is a schematic diagram showing the architecture of an optical read/write head which utilizes the knife-edge focusing method for reading data from an optical disc, as designated by the reference numeral 1. As shown, this read/write head includes an object lens 2, a knife-edge member 4, a focusing lens 6, and a photo detector 8. The reflected light from the optical disc 1 is first collimated by the object lens 2 into a straight beam. The knife-edge member 4 is disposed in such a manner as to block a half part of the reflected light from the object lens 2, allowing another half part of the same to reach and pass through the focusing lens 6 and subsequently reach the photo detector 8. The spotted area of the reflected light on the photo detector 8 is therefore the half of a circle (i.e., semicircle in shape). The photo detector 8 is formed with two separate light-sensitive areas (not shown), including a bottom light-sensitive area and a top light-sensitive area. In a defocused condition when the reflected light from the optical disc is focused by the focusing lens 6 at a point in back of the photo detector 8, the reflected light will be spotted largely on the top light-sensitive area; whereas when the reflected light from the optical disc is focused by the focusing lens 6 at a point in front of the photo detector 8, the reflected light will be largely spotted on the bottom light-sensitive area; and in focused condition, the reflected light will be spotted on the center of the photo detector 8. The opto-electrical signals generated from the light-sensitive areas of the photo detector 8 are then used to control the read/write head either toward or away from the optical disc 1 until the focusing condition is achieved.

Further, optical read/write heads that utilize the astigmatic focusing method are disclosed in Japanese Patent Sho-59-167863, and Japanese Patent Sho-54-39101, to name a few.

FIG. 2 is a schematic diagram showing the architecture of an optical read/write head which utilizes the astigmatic focusing method for reading data from an optical disc, as designated by the reference numeral 1. As shown, this read/write head includes an object lens 2, a focusing lens group (including a concave lens 6 and a spherical lens 12), and a photo detector 8. The reflected light from the optical disc 1 propagates successively through the object lens 2, the concave lens 6, and the spherical lens 12 to be finally received by the photo detector 8. When the laser beam is in focused condition on the optical disc 1, the reflected light from the optical disc will form a circular spotted area on the photo detector 8. Otherwise, the spotted area will be an elliptical shape. The elliptical shape resulted from a defocusing in front of the optical disc and that resulted from a defocusing in the back of the optical disc are oriented in perpendicular directions on the photo detector 8. In either of these conditions, the light-sensitive areas of the photo detector 8 will receive different amounts of light, thereby generating opto-electrical signals of different magnitudes that can be used to obtain the focusing error signal for feedback control of the focusing of the laser beam used to read data from the optical disc 1.

When reading a high density optical disc, the most widely used tracking method is the so-called push-pull tracking method. The opto-electrical signals obtained from this method are processed by either the differential phase detection (DPD) method, the heterodyne method, or the push-pull method to obtain the tracking error signal. The optical disc is formed with a multiplicity of pits in the surface thereof to represent the data stored thereon. When a laser beam is focused on the optical disc, these pits will act like a grating that causes diffraction to the reflection of the incident laser beam. The constructive interference and destructive interference in the reflected light from the optical disc respectively represent the two values of the binary data stored on the optical disc. The data can be correctly read out only when the laser beam is focused precisely on the target track where the data to be read out are located. When the laser beam is under a mistracking condition, it can be pushed outwards or pulled inwards in the radial direction until the target tracked is spotted.

In conventional read/write heads, the focusing error signal and the tracking error signal are separately detected by different optical systems. Therefore, due to the need to combine the focusing control and tracking control into the same optical system, the read/write head is quite complex in structure and requires a great number of optical components to construct, particularly in the case of constructing a DVD read/write head. The manufacturing cost is therefore quite high. Moreover, conventional DVD read/write heads customarily utilize a combination of the astigmatic focusing method and the push-pull tracking method. In these read/write heads, however, the opto-electrical signals generated from the astigmatic focusing system and those from the push-pull tracking method can cause cross-talk to each other, resulting in a degradation to the accuracy of the focusing and tracking control.

SUMMARY OF THE INVENTION

It is therefore an objective of the present invention to provide a focusing and tracking method and system for use on the read/write head of an optical drive, such as a DVD drive, by which the focusing error signal and the tracking error signal can be detected and obtained from the same photo detecting means, allowing the overall system to be simplified in structure for reduced manufacturing cost.

It is another an objective of the present invention to provide a focusing and tracking method and system for use on the read/write head of an optical drive, which can obtain the focusing error signal and the tracking error signal from the same photo detecting means, so the focusing and tracking control thereof is easy to implement.

It is still another objective of the present invention to provide a focusing and tracking method and system for use on the read/write head of an optical drive, which can prevent the occurrence of cross-talk between the resultant focusing error signal and tracking error signal as in the conventional systems utilizing a combination of the astigmatic focusing method and the push-pull tracking method.

In accordance with the foregoing and other objectives of the present invention, a new focusing and tracking method and system for use on the read/write head of an optical drive is provided.

The focusing and tracking method of the invention includes the following steps of: generating a laser beam; guiding the laser beam to an optical disc; focusing the laser beam on the optical disc; guiding the reflected light from the optical disc to a double-focal-length device capable of focusing a first part of the reflected light at a first focus point and a second part of the same at a second focus point; guiding the light passing through the double-focal-length device to a photo detector having a central zone and a peripheral zone; the central zone being disposed to receive the first part of the reflected light so as to obtain a focusing error signal therefrom, the focusing error signal being subsequently used for feedback control the focusing of the laser beam until the laser beam is focused precisely on the optical disc, and the peripheral zone being disposed to receive the second part of the reflected light so as to obtain a tracking error signal therefrom, the tracking error signal being subsequently used for feedback control of the tracking of the laser beam until the laser beam is spotted on the target track on the optical disc.

The focusing and tracking system of the invention includes the following constituent components: a laser source for generating a laser beam; light guiding means for guiding the laser beam to an optical disc; focusing means, optically coupled to the light guiding means, for focusing the laser beam onto the optical disc; a double-focal-length device, which receives the reflected light from the optical disc, capable of focusing a first part of the reflected light at a first focus point and a second part of the same at a second focus point; and a photo detector coupled to receive the light passing the double-focal-length device, the photo detector having a central zone and a peripheral zone. In particular, the central zone of the photo detector is disposed to receive the first part of the reflected light so as to obtain a focusing error signal therefrom, the focusing error signal being subsequently used for feedback control the focusing of the laser beam until the laser beam is focused precisely on the optical disc; and the peripheral zone of the photo detector is disposed to receive the second part of the reflected light so as to obtain a tracking error signal therefrom, the tracking error signal being subsequently used for feedback control of the tracking of the laser beam until the laser beam is spotted on the target track on the optical disc.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

This invention is characterized in the provision of a double-focal-length device on the propagation path of the reflected light from the optical disc prior to being received by the photo detector means. This double-focal-length device has various forms, as respectively depicted in the following with reference to FIGS. 3A–3E.

Figure 1:
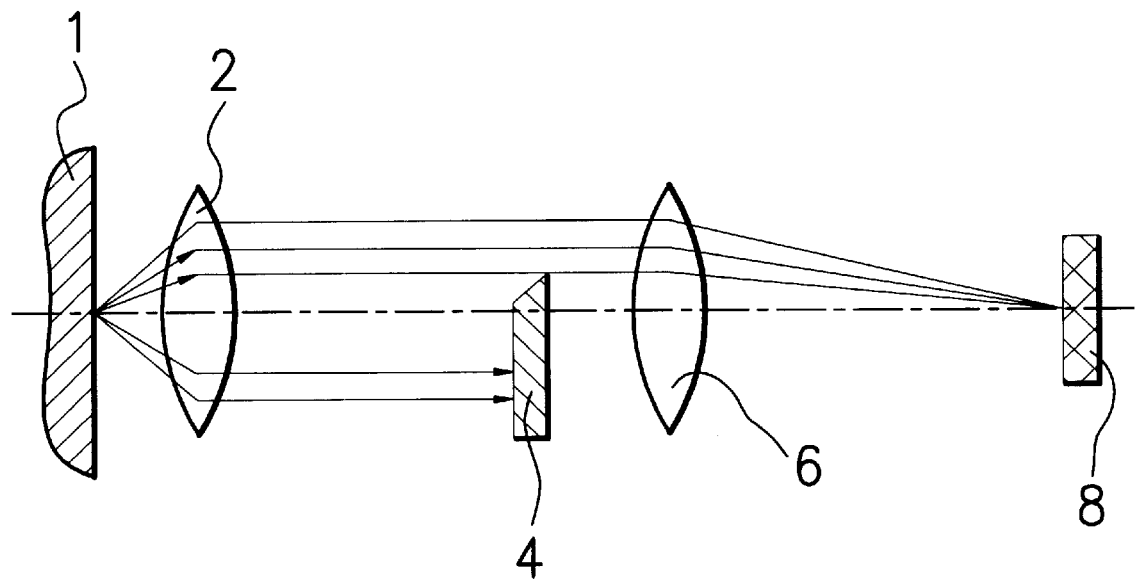
FIG. 1 is a schematic diagram showing the architecture of an optical read/write head which utilizes the knife-edge focusing method.
Figure 2:
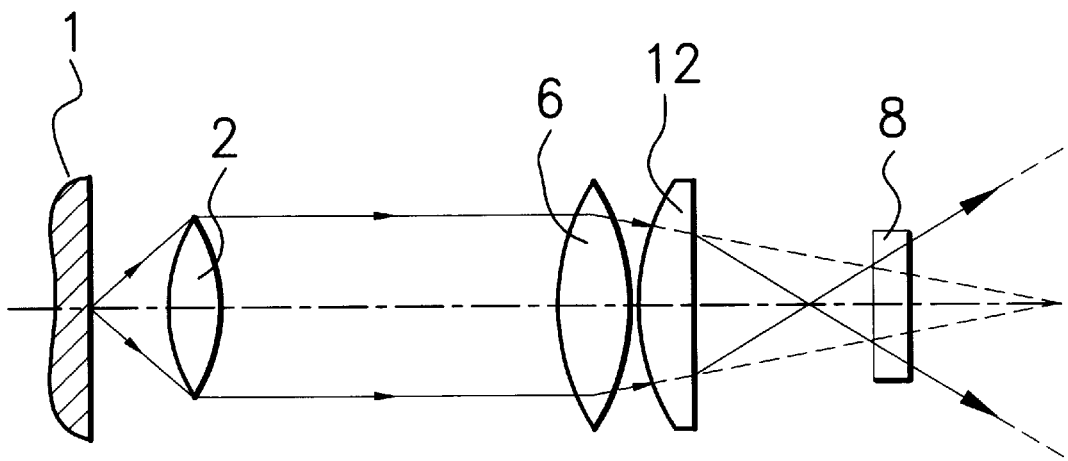
FIG. 2 is a schematic diagram showing the architecture of an optical read/write head which utilizes the astigmatic focusing method.
Figure 3A:
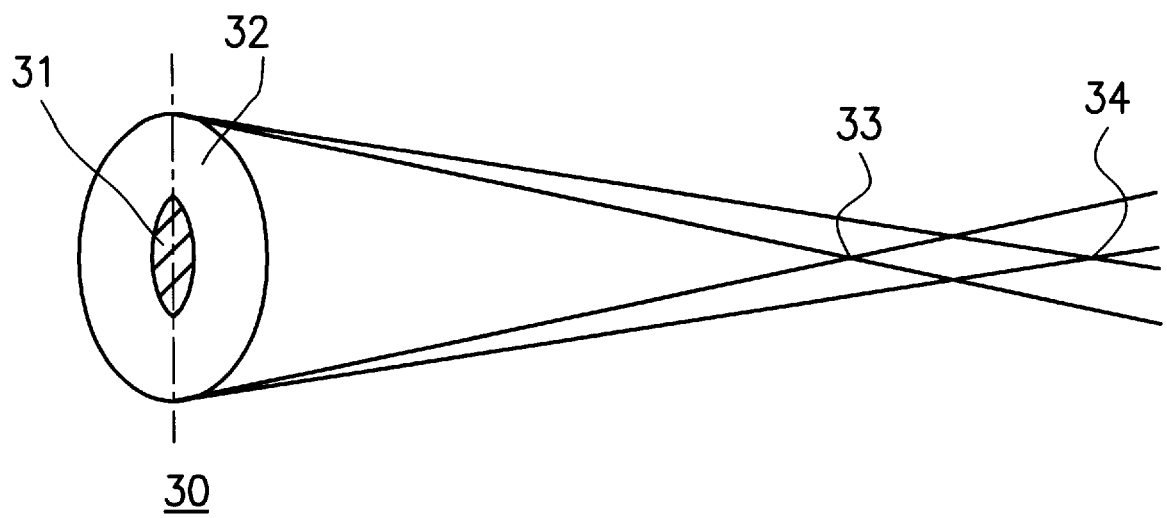
FIG. 3A shows one example of a double-focal-length device utilized in the invention.

As shown in FIG. 3A, one example of the double-focal-length device, here designated by the reference numeral 30, is formed with two concentric lens portions including a first lens portion 31 in the center and a second lens portion 32 surrounding the first lens portion 31. The first lens portion 31 has a first focal length (represented by the focal point 33) and the second lens portion 32 has a second focal length (represented by the farther focal point 34) which is greater than the first focal length. The first lens portion 31 is suited for the knife-edge focusing method to obtain the focusing error signal, while the second lens portion 32 is suited for the push-pull tracking method to obtain the tracking error signal.

Figure 3B:
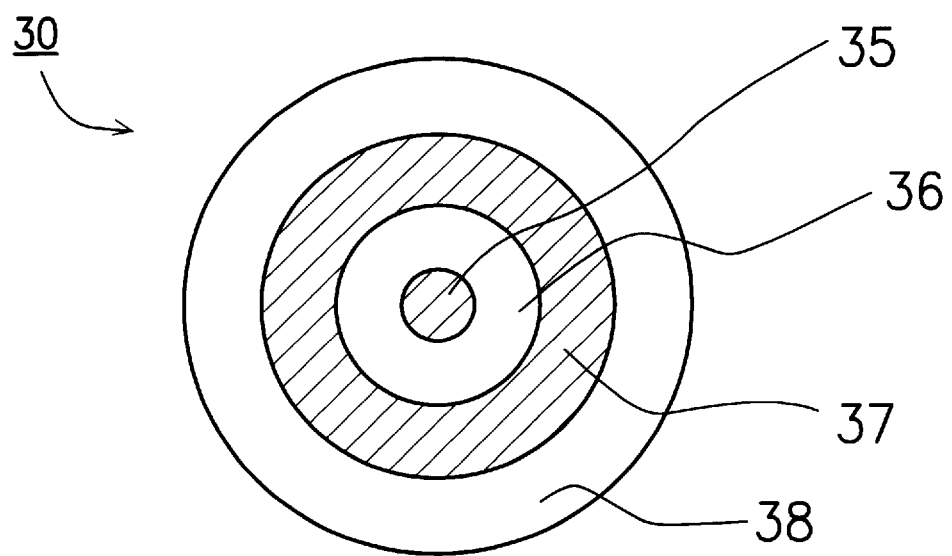
FIG. 3B shows another example of a double-focal-length device utilized in the invention.

FIG. 3B shows another example of the double-focal-length device 30, which is here formed with four concentric lens portions including a first lens portion 35 in the center, a second lens portion 36 surrounding the first lens portion 35, a third lens portion 37 surrounding the second lens portion 36, and a fourth lens portion 38 surrounding the third lens portion 37. This double-focal-length device 30 is designed in such a manner that the first and third lens portions 35, 37 in combination allow the light passing therethrough to converge altogether at a first focus point, while the second and fourth lens portions 36, 38 in combination allow the light passing, therethrough to converge altogether at a second focus point.

Figure 3C:
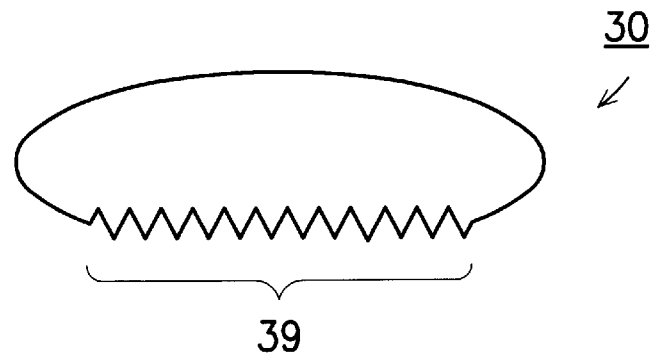
FIG. 3C shows still another example of a double-focal-length device utilized in the invention.

FIG. 3C shows still another example to the double-focal-length device 30, which is here an optical element formed with a sawtooth edge 39. This sawtooth edge 39 serves as a diffraction grating to the light passing therethrough, allowing the zero-order component of the diffracted light to converge at the first focus point and the first-order component to converge at the second focus point.

Figure 3D:
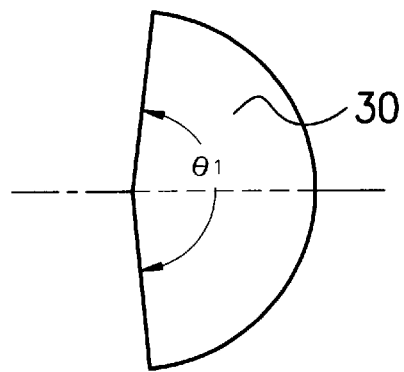
FIG. 3D shows yet another example of a double-focal-length device utilized in the invention, which can provide a knife-edge effect.
Figure 3E:
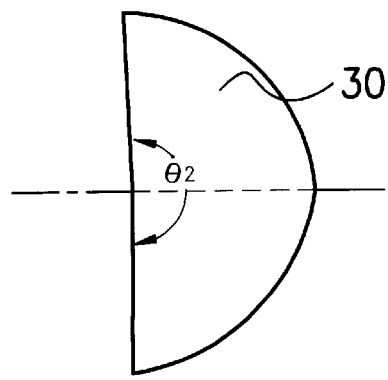
FIG. 3E shows still yet another example of a double-focal-length device utilized in the invention, which can provide a knife-edge effect.

Further, FIGS. 3D and 3E are examples of the double-focal-length device 30 which can provide a knife-edge effect to the light passing therethrough. In these examples, the double-focal-length device 30 is either a plano-convex lens or a plano-concave lens.

As shown in FIG. 3D, in this example, the plane side of the lens is formed with a wedge with a protrusion angle $\theta_1$ slightly less than 180°. This wedge allows the double-focal-length device 30 to provide a knife-edge effect to the reflected light from the optical disc passing therethrough.

Further, as shown in FIG. 3E, in this example, the knife-edge effect can be alternatively provided by cutting the lens into two halves and then rotating the two halves with respect to each other by a predetermined small angle, making the angle $\theta_2$ on the plane side to be slightly larger than 180°. The predetermined angle is less than 1°. This structure allows the reflected light from the optical disc to be divided into two half parts, each of which will strike on the photo detector at different zones thereof, which is equivalent to a knife-edge effect.

First Preferred Embodiment

Figure 4:
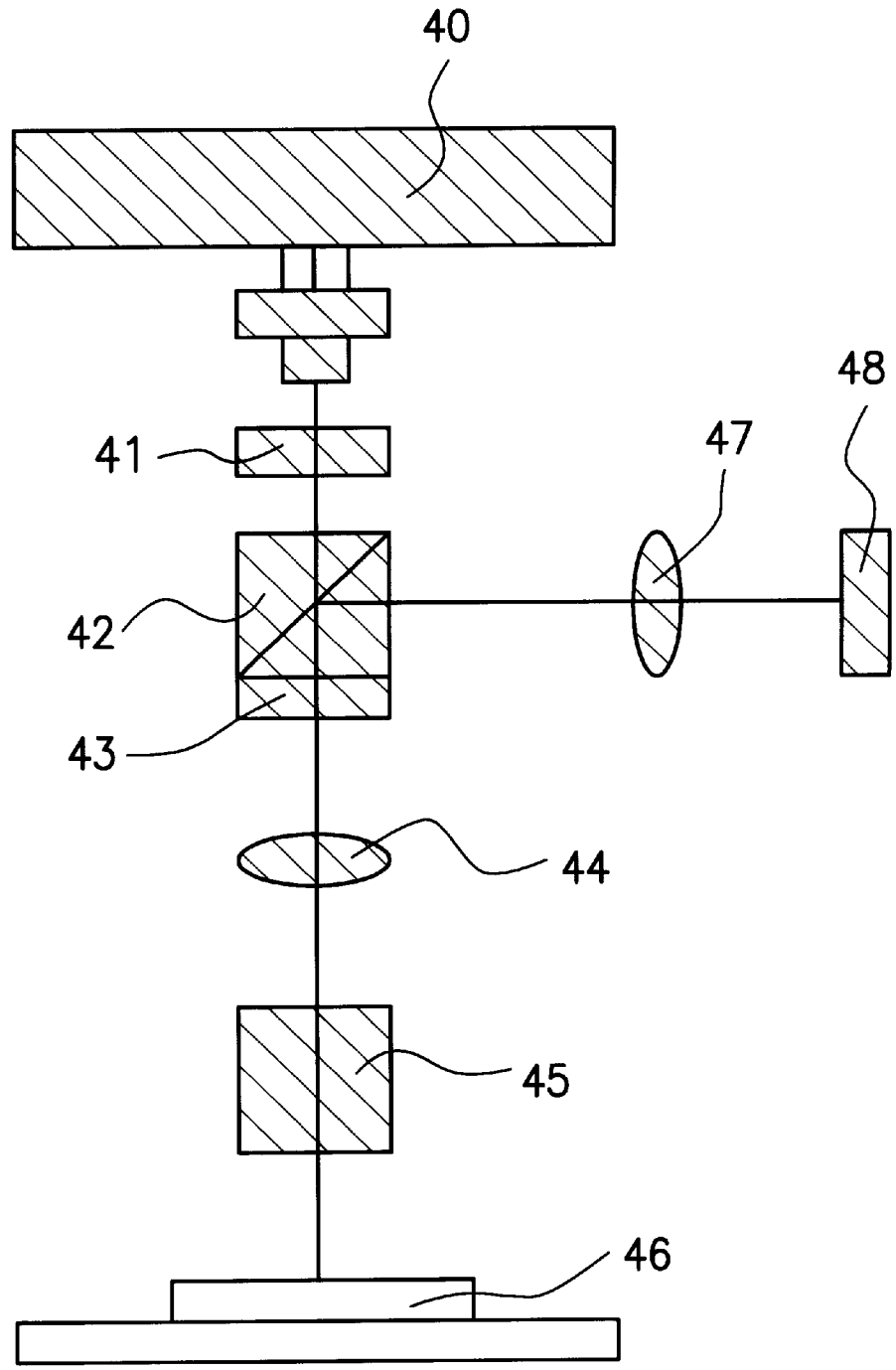
FIG. 4 is a schematic diagram showing the architecture of a first preferred embodiment of the focusing and tracking method and system according to the invention.

FIG. 4 is a schematic diagram showing the architecture of a first preferred embodiment of the focusing and tracking method and system according to the invention, which utilizes the foregoing double-focal-length device (here designated by the reference numeral 47), for reading data from an optical disc 46 (which can be either a CD or a DVD). In particular, this focusing and tracking method and system uses two switchable object lenses respectively to read data from either a CD or a DVD.

As shown, this focusing and tracking system includes a laser source 40, a grating 41, a polarization beam splitter 42, a λ/4 plate (quarter-wavelength plate) 43, a collimating lens 44, a lens switching unit 45 which is switchable between two object lenses depending on the type of the optical disc being read, i.e., a CD or a DVD), a double-focal-length device 47 (which can be any one of those shown respectively in FIGS. 3A–3E) and a photo detector 48.

The laser source 40 is used to generate a laser beam which then propagates successively through the grating 41, the polarization beam splitter 42, and the λ/4 plate 43 to the collimating lens 44. The functions of these optical components 41, 42, 43 are well know in the art, so description thereof will not be further detailed. At the collimating lens 44, the laser beam is collimated into a straight beam which is then focused by the currently selected object lens of the lens switching unit 45 onto the optical disc 46. The reflected light from the optical disc 46 then propagates reversely through the object lens 45, the collimating lens 44, and the λ/4 plate 43 back to the polarization beam splitter 42 where the reflected light is directed sideways to the double-focal-length device 47. The reflected light then passes through this specially designed double-focal-length device 47 and subsequently strikes on the photo detector 48.

The photo detector 48 is formed with a number of light-sensitive areas, each being capable of generating an opto-electrical signal whose magnitude is proportional to the intensity of the light spotted thereon. The opto-electrical signals generated from these light-sensitive areas can be used to obtain both the focusing error signal and the tracking error signal. Details of this will be described later in this section with reference to FIGS. 8A–8B.

Second Preferred Embodiment

Figure 5:
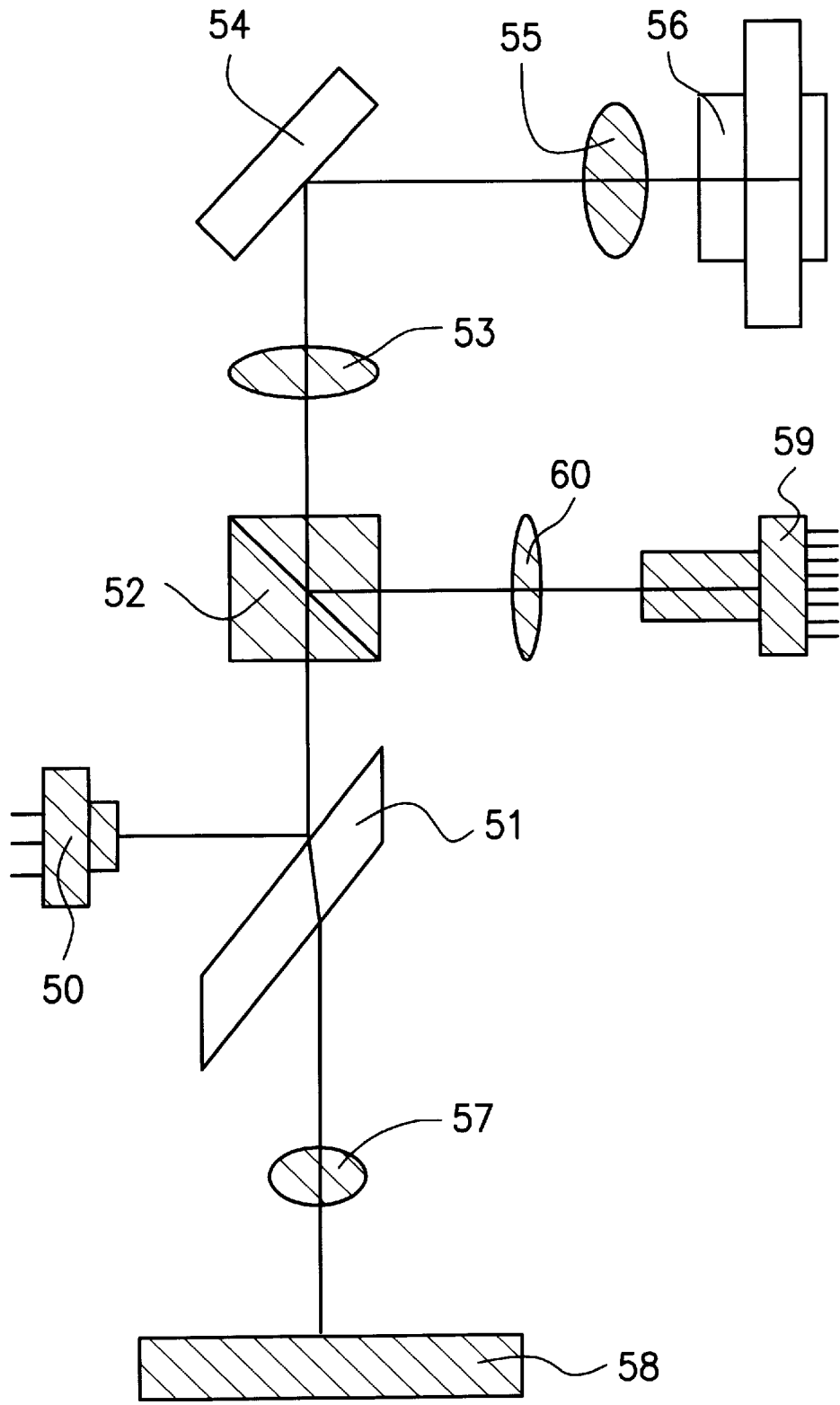
FIG. 5 is a schematic diagram showing the architecture of a second preferred embodiment of the focusing and tracking method and system according to the invention.

FIG. 5 is a schematic diagram showing the architecture of a second preferred embodiment of the focusing and tracking method and system according to the invention, which utilizes the foregoing double-focal-length device (here designated by the reference numeral 57), for reading data from an optical disc 56 (which can be either a CD or a DVD). In particular, this focusing and tracking method and system uses two laser sources of different specifications in wavelength respectively to read data from either a CD or a DVD.

As shown, the focusing and tracking system of this embodiment includes a first laser source 50 of 650 nm in wavelength, a beam splitter 51, a dicho beam-splitting prism 52, a collimating lens 53, a reflective mirror 54, an object lens 55, a double-focal-length device 57 (which can be any one of those shown respectively in FIGS. 3A–3E), a photo detector 58, a second laser source 59 (in a laser module) of 780 nm in wavelength, and a compensating lens 60.

When the optical disc 56 is a DVD, the first laser source 50 is activated while the second laser source 59 is deactivated. The laser beam from the first laser source 50, which is 650 nm in wavelength, is then reflected by the beam splitter 51 to the dicho beam-splitting prism 52, subsequently passes through the dicho beam-splitting prism 52 and the collimating lens 53 to the reflective mirror 54. At the reflective mirror 54, the laser beam is reflected to the object lens 55 which then focuses the laser beam onto the target track on the optical disc 56 (DVD) where the data to be read out are located. The functions of these optical components 51, 52, 53, 54, 55 are well know in the art, so description thereof will not be further detailed. The reflected light from the optical disc 56 then passes reversely through the object lens 55, the reflective mirror 54, the collimating lens 53, the dicho beam-splitting prism 52, and the beam splitter 51 to the specially designed double-focal-length device 57. The reflected light from the optical disc then passes through this double-focal-length device 57 and subsequently strikes on the photo detector 58.

By contrast, when the optical disc 56 is a CD, the second laser source 59 is activated while the first laser source 50 is deactivated. The laser beam from the second laser source 59, which is 780 nm in wavelength, then passes through the compensating lens 60 to the dicho beam-splitting prism 52 where the laser beam is reflected sideways to the collimating lens 53. After passing through the collimating lens 53, the laser beam is then reflected by the reflective mirror 54 to the object lens 55 which focuses the laser beam onto the target track on the optical disc 56 (CD) where the data to be read out are located. In the foregoing system, the compensating lens 60 is used to compensate for the spherical aberration caused by the object lens 55 on the reflected light from the optical disc. The reflected light from the optical disc 56 then passes reversely through the object lens 55, the reflective mirror 54, the collimating lens 53, the dicho beam-splitting prism 52, and the compensating lens 60 back to the second laser source 59. The reflected light from the optical disc then passes through a holographic device in the laser module (in which the second laser source 59 is mounted) to be subsequently received by a photo detector.

Optically, the 650 nm laser beam is a high numerical aperture infinite system used to read data from a DVD; while the 780 nm laser beam is a low numerical aperture finite conjugate system, which is generated from a laser module that integrates a laser diode, a holographic device, a three-beam grating, and a photo detector therein, used to read data from a CD.

The photo detector mentioned above is formed with a number of light-sensitive areas, each being capable of generating an opto-electrical signal whose magnitude is proportional to the intensity of the light spotted thereon. The opto-electrical signals generated from these light-sensitive areas can be used to obtain both the focusing error signal and the tracking error signal. Details of this will be described later in this section with reference to FIGS. 8A–8B.

Third Preferred Embodiment

Figure 6:
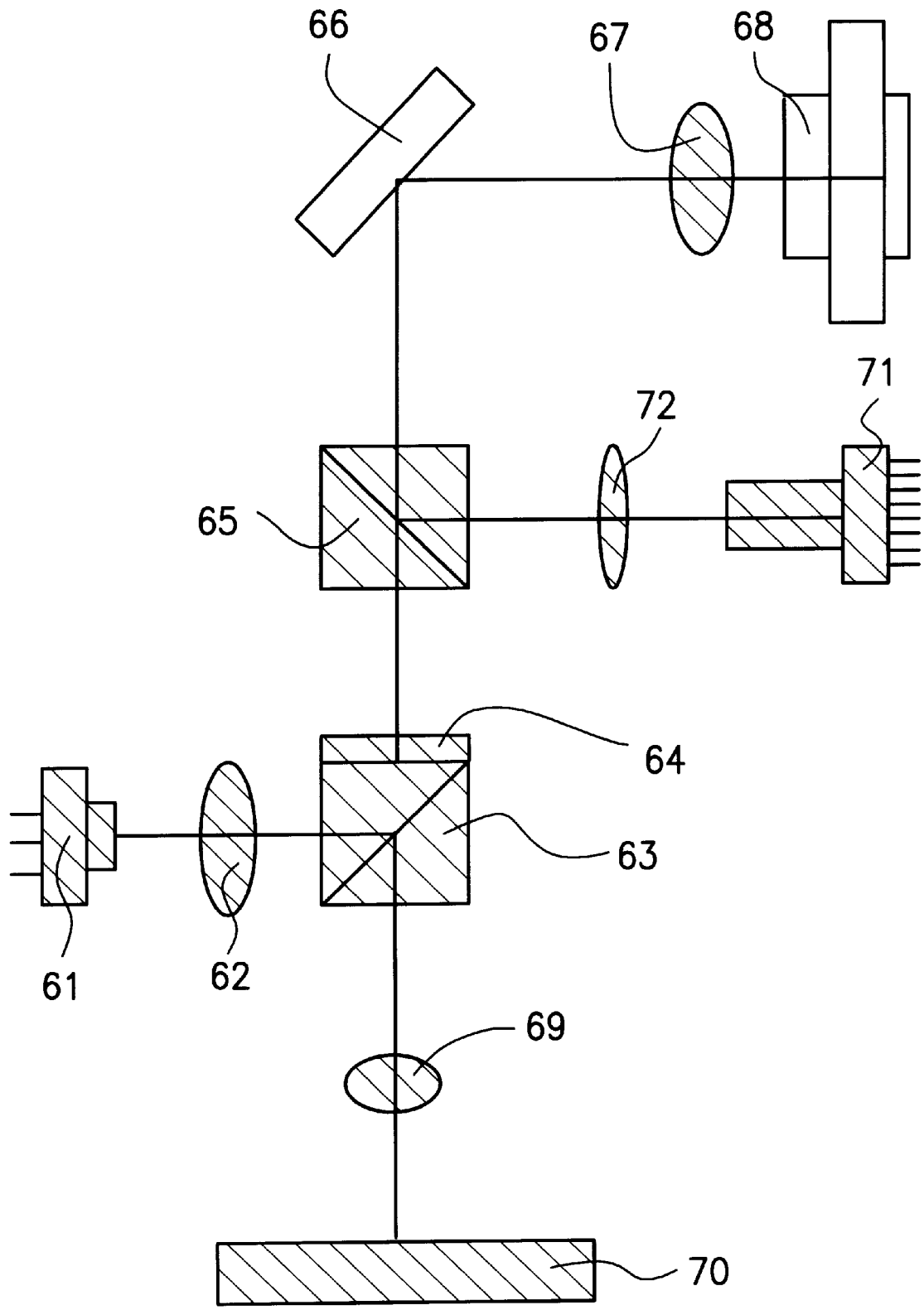
FIG. 6 is a schematic diagram showing the architecture of a third preferred embodiment of the focusing and tracking method and system according to the invention.

FIG. 6 is a schematic diagram showing the architecture of a third preferred embodiment of the focusing and tracking method and system according to the invention for reading data from an optical disc 68 (which can be either a CD or a DVD). In particular, this focusing and tracking method and system uses two laser sources of different specifications in wavelength respectively to read data from either a CD or a DVD.

As shown, the focusing and tracking system of this embodiment includes a first laser source 61 of 650 nm in wavelength, a collimating lens 62, a polarization prism 63, a λ/4 plate 64, a dicho beam-splitting prism 65, a reflective mirror 66, an object lens 67, a double-focal-length device 69 (which can be any one of those shown respectively in FIGS. 3A–3E), a photo detector 70, a second laser source 71 of 780 nm in wavelength, and a compensating lens 72.

In the case of the optical disc 68 being read is a DVD, the first laser source 61 is activated while the second laser source 71 is deactivated. The laser beam from the first laser source 61, which is 650 nm in wavelength, then propagate through the collimating lens 62, the polarization prism 63, the λ/4 plate 64, the dicho beam-splitting prism 65, the reflective mirror 66, and the object lens 67 to the optical disc 68 (DVD). The functions of these optical components are well known in the art, so description thereof will not be further detailed. The reflected light from the optical disc 68 then propagates reversely through the object lens 67, the reflective mirror 66, the dicho beam-splitting prism 65, the λ/4 plate 64, and the polarization prism 63 to the double-focal-length device 69, subsequently received by the photo detector 70.

By contrast, in the case of the optical disc 68 being read is a CD, the second laser source 71 is activated while the first laser source 61 is deactivated. The laser beam from the second laser source 71, which is 780 nm in wavelength, then propagates through the compensating lens 72, the dicho beam-splitting prism 65, the reflective mirror 66, and the object lens 67 to the optical disc 68. The functions of these optical components are well known in the art, so description thereof will not be further detailed. The reflected light from the optical disc 68 then propagates reversely through the object lens 67, the reflective mirror 66, the dicho beam-splitting prism 65, and the compensating lens 72 back to the second laser source 71. The reflected light from the optical disc then passes through a holographic device in the laser module (in which the second laser source 71 is mounted) to be subsequently received by a photo detector.

This embodiment differs from the previous one in that this embodiment utilizes a collimating lens of a shorter focal length, a polarization prism, and a λ/4 plate for increased optical performance.

The photo detector mentioned above is formed with a number of light-sensitive areas, each being capable of generating an opto-electrical signal whose magnitude is proportional to the intensity of the light spotted thereon. The opto-electrical signals generated from these light-sensitive areas can be used to obtain both the focusing error signal and the tracking error signal. Details of this will be described later in this section with reference to FIGS. 8A–8B.

Fourth Preferred Embodiment

Figure 7:
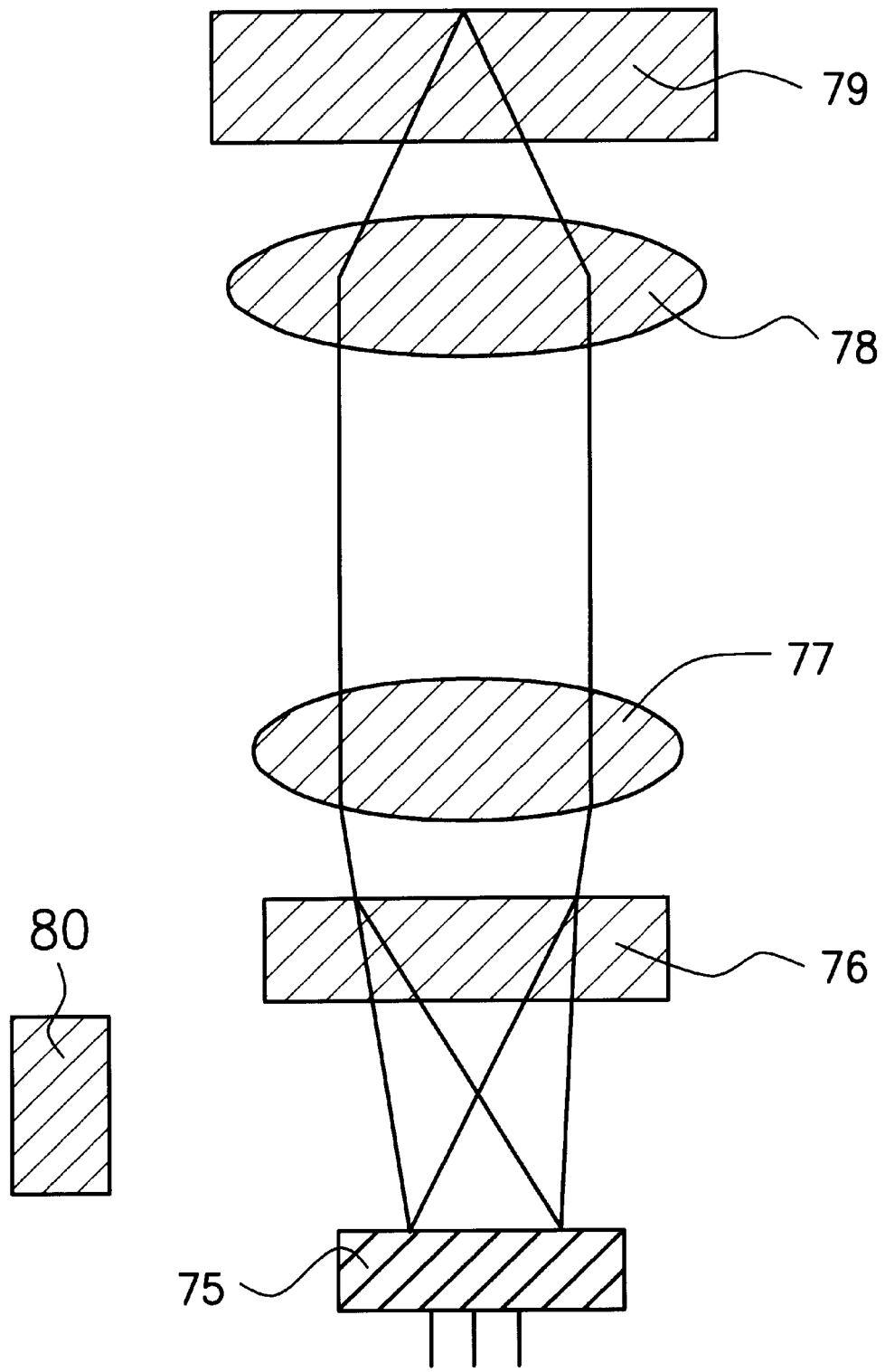
FIG. 7 is a schematic diagram showing the architecture of a fourth preferred embodiment of the focusing and tracking method and system according to the invention.

FIG. 7 is a schematic diagram showing the architecture of a fourth preferred embodiment of the focusing and tracking method and system according to the invention for reading data from an optical disc 79 (which can be either a CD or a DVD). In particular, this focusing and tracking method and system uses a holographic means to provide a double-focal-length effect which is provided by the double-focal-length device in the previous embodiments.

As shown, the focusing and tracking system of this embodiment includes a laser source 75, a holographic optical element (HOE) 76, a collimating lens 77, an object lens 78, and a photo detector 80. The laser beam from the laser source 75 propagates through the HOE 76, the collimating lens 77, and the object lens 78 to the optical disc 79. The reflected light from the optical disc 79 then propagates reversely through the object lens 78 and the collimating lens 77 to the HOE 76 where the reflected light is divided into two half portions subsequently received by the photo detector 80.

The photo detector 80 here is formed with a number of light-sensitive areas, each being capable of generating an opto-electrical signal whose magnitude is proportional to the intensity of the light spotted thereon. The opto-electrical signals generated from these light-sensitive areas can be used to obtain both the focusing error signal and the tracking error signal. Details of this will be described later in this section with reference to FIGS. 8A–8B.

The Photo Detector

Figure 8A:
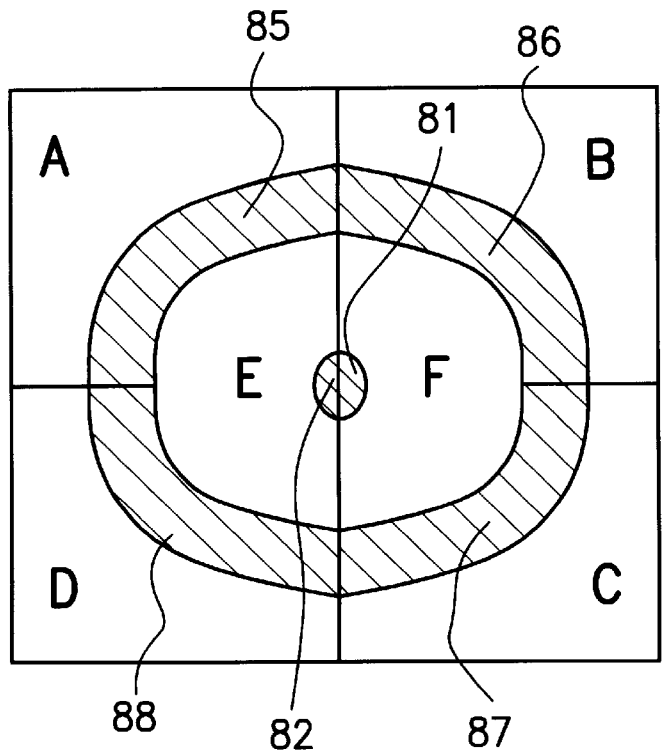
FIG. 8A is a schematic diagram showing a first geometric design of a photo detector utilized in the focusing and tracking method and system of the invention.
Figure 8B:
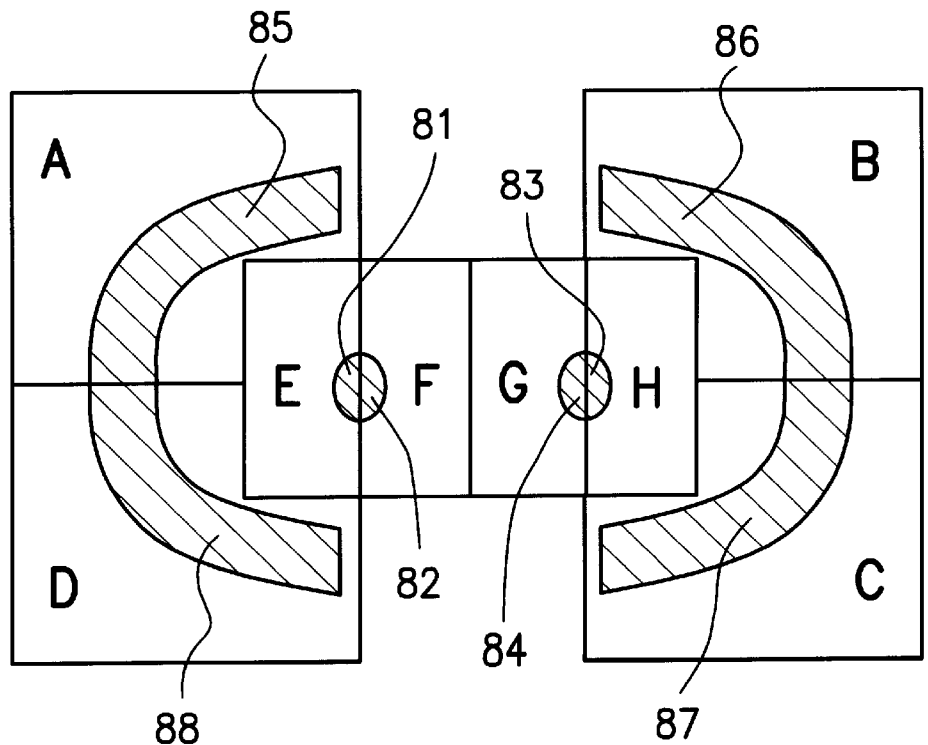
FIG. 8B is a schematic diagram showing a second geometric design of a photo detector utilized in the focusing and tracking method and system of the invention.

FIGS. 8A–8B show two examples of the photo detector utilized in the above-mentioned four preferred embodiments of the invention.

As shown in FIG. 8A, the photo detector is formed with a peripheral zone, where four light-sensitive areas A, B, C, D are formed in a quadrature manner, and a central zone, where two light-sensitive areas E, F are formed; each of the light-sensitive areas A, B, C, D, E, F is capable of generating an opto-electrical signal whose magnitude is proportional to the intensity of the light spotted thereon. The opto-electrical signals generated by these light-sensitive areas A, B, C, D, E, F are respectively fetched from the connecting areas 81, 82, 85, 86, 87, 88. The focusing error signal is obtained from (E−F), where E, F here represent the opto-electrical signals generated respectively by the two light-sensitive areas in the central zone of the photo detector.

Alternatively, as shown in FIG. 8B, the photo detector is formed with a peripheral zone, where four light-sensitive areas A, B, C, D are formed in a quadrature manner, and a central zone, where another four light-sensitive areas E, F, G, H are formed in a side-by-side manner; each of the light-sensitive areas A, B, C, D, E, F, G, H is capable of generating an opto-electrical signal whose magnitude is proportional to the intensity of the light spotted thereon. The opto-electrical signals generated by these light-sensitive areas A, B, C, D, E, F, G, H are respectively fetched from the connecting areas 81, 82, 83, 84 85, 86, 87, 88. In the case of FIG. 8B, the focusing error signal is obtained from (E−F)+(H−G), where E, F, H, G here represent the opto-electrical signals generated respectively by the two light-sensitive areas in the central zone of the photo detector.

In both of the cases of FIGS. 3A and 3B, if the DPD tracking method is used, the tracking error signal is obtained from (A+C)−(B+D), where A, B, C, D here represent the opto-electrical signals generated respectively by the four light-sensitive areas in the peripheral zone of the photo detector; and if the push-pull tracking method is used, the tracking error signal is obtained from (A+B)−(C+D) or (A+D)−(B+C).

In conclusion, the invention is characterized in that it uses a combination of the knife-edge focusing method for focusing control of the read/write head and the push-pull tracking method for tracking control of the same. Second, the invention is characterized in that the knife-edge effect is provided on a plane which is parallel to the surface of the optical disc, allowing the focusing error signal and the tracking error signal to be obtained while moving the read/write heads in perpendicular directions respectively, so that the undesired effect of cross-talk between the two error signals can be avoided. Third, the invention is characterized in the provision of a double-focal-length device which can focus the reflected light from the optical disc at two different focus points, which two parts of the reflected light are then respectively used to obtain the focusing error signal and the tracking error signal. In addition, the double-focal-length device can be designed to provide a knife-edge effect. Fourth, the invention is characterized in the provision of a specially designed photo detector which can be used to obtain both the focusing error signal and the tracking error signal. This allows the focusing and tracking system to be simplified in structural complexity which needs a fewer number of optical components to construct, thereby saving manufacturing cost. The read/write head is also more compact in size.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A focusing and tracking method for use on an optical drive to control the focusing and tracking of a read/write head, comprising the steps of:

generating a laser beam;

guiding the laser beam to an optical disc;

focusing the laser beam on the optical disc;

guiding the reflected light from the optical disc to a double-focal-length device that includes a single lens having a first focusing portion to focus a first part of the reflected light at a first focus point, and having a second focusing portion to focus a second part of the reflected light at a second focus point that is different than the first focus point;

guiding the light passing through said double-focal-length device to a photo detector having a central zone and a peripheral zone;

said central zone being disposed to receive the first part of the reflected light so as to obtain a focusing error signal therefrom, said focusing error signal being subsequently used for feedback control of the focusing of the laser beam until the laser beam is focused precisely on the optical disc, and said peripheral zone being disposed to receive the second part of the reflected light so as to obtain a tracking error signal therefrom, said tracking error signal being subsequently used for feedback control of the tracking of the laser beam until the laser beam is spotted on the target track on the optical disk.

2. The method of claim 1, wherein the direction in which the focusing error signal is obtained is perpendicular to the direction in which the tracking error signal is obtained from said photo detector.

3. The method of claim 1, wherein said double-focal-length device is an optical element formed with two concentric lens portions including:

a first lens portion which allows the light passing therethrough to converge at the first focus point; and a second lens portion surrounding said first lens portion, which allows the light passing therethrough to converge at the second focus point.

4. The method of claim 1, wherein said double-focal-length device is an optical element formed with four concentric lens portions including:

a first lens portion which allows the light passing therethrough to converge at the first focus point;

a second lens portion surrounding said first lens portion, which allows the light passing therethrough to converge at the second focus point;

a third lens portion surrounding said second lens portion, which allows the light passing therethrough to converge at the first focus point; and a fourth lens portion surrounding said third lens portion, which allows the light passing therethrough to converge at the second focus point.

5. The method of claim 1, wherein said double-focal-length device is an optical element formed with a sawtooth edge which serves as a diffraction grating to the reflected light from the optical disc.

6. The method of claim 5, wherein the pitch of said sawtooth edge is formed in such a manner as to allow the zero-order component of the diffracted light to converge at the first focus point and the first-order component of the same to converge at the second focus point.

7. The method of claim 1, wherein said double-focal-length device comprises an HOE.

8. The method of claim 1, wherein the central zone of said photo detector is formed with two light-sensitive areas disposed in a side-by-side manner to detect the first part of the reflected light converging at the first focus point.

9. The method of claim 8, wherein the focusing error signal is obtained from (E–F), where E, F are the opto-electrical signals generated respectively by said two light-sensitive areas in the central zone of said photo detector.

10. The method of claim 1, wherein the central zone of said photo detector is formed with four light-sensitive areas disposed in a side-by-side manner to detect the first part of the reflected light converging at the first focus point.

11. The method of claim 10, wherein the focusing error signal is obtained from (E–F)+(H–G), where E, F, H, G are the opto-electrical signals generated respectively by said four light-sensitive areas in the central zone of said photo detector.

12. The method of claim 1, wherein the peripheral zone of said photo detector is formed with four light-sensitive areas disposed in a quadrature manner to detect the second part of the reflected light converging at the second focus point.

13. The method of claim 12, wherein in the case of using the DPD tracking method, the tracking error signal is obtained from (A+C)–(B+D), where A, B, C, D are the opto-electrical signals generated respectively by said four light-sensitive areas in the peripheral zone of said photo detector.

14. The method of claim 12, wherein in the case of using the push-pull tracking method, the tracking error signal is obtained either from (A+B)–(C+D) or from (A+D)–(B+C), where A, B, C, D are the opto-electrical signals generated respectively by said four light-sensitive areas in the peripheral zone of said photo detector.

15. The method of claim 1, wherein said double-focal-length device is a plano-convex lens.

16. The method of claim 15, wherein the plane side of said plano-convex lens is formed with a wedge.

17. The method of claim 15, wherein said plano-convex lens is cut into two halves which are then rotated by a predetermined angle with respect to each other, capable of providing a knife-edge effect.

18. The method of claim 17, wherein said predetermined angle is less than 1°.

19. The method of claim 1, wherein said double-focal-length device is a plano-concave lens.

20. The method of claim 19, wherein the plane side of said plano-concave lens is formed with a wedge.

21. The method of claim 19, wherein said plano-concave lens is cut into two halves which are then rotated by a predetermined angle with respect to each other, so as to provide a knife-edge effect.

22. The method of claim 21, wherein said predetermined angle is less than 1°.

23. The method of claim 1, wherein the laser beam has a wavelength of 650 nm.

24. The method of claim 1, wherein the laser beam has a wavelength of 780 nm.

25. The method of claim 1, wherein said laser beam is generated from a laser module in which the laser source and the photo detector are included.

26. A focusing and tracking system for use on an optical drive to control the focusing and tracking of a read/write head, which comprises:

a laser source for generating a laser beam;

light guiding means for guiding the laser beam to an optical disc;

focusing means, optically coupled to said light guiding means, for focusing the laser beam onto the optical disc;

a double-focal-length device that includes a single lens having first and second focusing portions which are achieved only through said single lens, the lens receiving the reflected light from the optical disc, with the first focusing portion focusing a first part of the reflected light at a first focus point, and the second focusing portion focusing a second part of the reflected light at a second focus point that is different than the first focus point; and a photo detector coupled to receive the light passing said double-focal-length device, said photo detector having a central zone and a peripheral zone;

said central zone being disposed to receive the first part of the reflected light so as to obtain a focusing error signal therefrom, said focusing error signal being subsequently used for feedback control of the focusing of the laser beam until the laser beam is focused precisely on the optical disc, and said peripheral zone being disposed to receive the second part of the reflected light so as to obtain a tracking error signal therefrom, said tracking error signal being subsequently used for feedback control of the tracking of the laser beam until the laser beam is spotted on the target track on the optical disc.

27. The system of claim 26, wherein said laser source and said photo detector are included together in a laser module.

28. The system of claim 26, wherein the laser beam generated by said laser source has a wavelength of 650 nm.

29. The system of claim 26, wherein the laser beam generated by said laser source has wavelength of 780 nm.

30. The system of claim 26, wherein said double-focal-length device is an optical element formed with two concentric lens portions including:

a first lens portion which allows the light passing therethrough to converge at the first focus point; and a second lens portion surrounding said first lens portion, which allows the light passing therethrough to converge at the second focus point.

31. The system of claim 26, wherein said double-focal-length device is an optical element formed with four concentric lens portions including:

a first lens portion which allows the light passing therethrough to converge at the first focus point;

a second lens portion surrounding said first lens portion, which allows the light passing therethrough to converse at the second focus point;

a third lens portion surrounding said second lens portion, which allows the light passing therethrough to converge at the first focus point; and a fourth lens portion surrounding said third lens portion, which allows the light passing therethrough to converge at the second focus point.

32. The system of claim 26, wherein said double-focal-length device is an optical element formed with a sawtooth edge which serves as a diffraction grating to the reflected light from the optical disc.

33. The system of claim 32, wherein the pitch of said sawtooth edge is formed in such a manner as to allow the zero-order component of the diffracted light to converge at the first focus point and the first-order component of the same to converge at the second focus point.

34. The system of claim 26, wherein said double-focal-length device comprises an HOE.

35. The system of claim 26, wherein the central zone of said photo detector is formed with two light-sensitive areas disposed in a side-by-side manner to detect the first part of the reflected light converging at the first focus point.

36. The system of claim 35, wherein the focusing error signal is obtained from (E−F), where E, F are the opto-electrical signals generated respectively by said two light-sensitive areas in the central zone of said photo detector.

37. The system of claim 26, wherein the central zone of said photo detector is formed with four light-sensitive areas disposed in a side-by-side manner to detect the first part of the reflected light converging at the first focus point.

38. The system of claim 37, wherein the focusing error signal is obtained from (E−F)+(H−G), where E, F, H, G are the opto-electrical signals generated respectively by said four light-sensitive areas in the central zone of said photo detector.

39. The system of claim 26, wherein the peripheral zone of said photo detector is formed with four light-sensitive areas disposed in a quadrature manner with reference to the center of said photo detector to detect the second part of the reflected light converging at the second focus point.

40. The system of claim 39, wherein in the case of using the DPD tracking method, the tracking error signal is obtained from (A+C)−(B+D), where A, B, C, D are the opto-electrical signals generated respectively by said four light-sensitive areas in the peripheral zone of said photo detector.

41. The system of claim 39, wherein in the case of using the push-pull tracking method, the tracking error signal is obtained either from (A+B)−(C+D) or from (A+D)−(B+C), where A, B, C, D are the opto-electrical signals generated respectively by said four light-sensitive areas in the peripheral zone of said photo detector.

42. The system of claim 26, wherein said double-focal-length device is a plano-convex lens.

43. The system of claim 42, wherein the plane side of said plano-convex lens is formed with a wedge.

44. The system of claim 42, wherein said plano-convex lens is cut into two halves which are then rotated by a predetermined angle with respect to each other, capable of providing a knife-edge effect.

45. The system of claim 44, wherein said predetermined angle is less than 1°.

46. The system of claim 26, wherein said double-focal-length device is a plano-concave lens.

47. The system of claim 46, wherein the plane side of said plano-concave lens is formed with a wedge.

48. The system of claim 46, wherein said plano-concave lens is cut into two halves which are then rotated by a predetermined angle with respect to each other, so as to provide a knife-edge effect.

49. The system of claim 48, wherein said predetermined angle is less than 1°.

50. The system of claim 26, wherein said focusing means comprises a plurality of focusing lenses which are selected for use depending on the type of the optical disc being read.

* * * * *